United States Patent
Kusama

[11] Patent Number: 6,041,823
[45] Date of Patent: Mar. 28, 2000

[54] FITTING FOR TIGHTENING STEEL PIPE

[75] Inventor: Yoshiji Kusama, Higashiosaka, Japan

[73] Assignee: Nikko Planning Co., Ltd., Osaka, Japan

[21] Appl. No.: 09/030,673

[22] Filed: Feb. 25, 1998

[30] Foreign Application Priority Data

Feb. 25, 1997 [JP] Japan ................................ 9-040900

[51] Int. Cl.$^7$ .............................. F16L 55/16; F16L 33/04
[52] U.S. Cl. .......................... 138/99; 285/253; 285/420; 411/338
[58] Field of Search ............................ 138/99, 156, 167, 138/158, 159; 411/338, 339; 285/252, 253, 420

[56] References Cited

U.S. PATENT DOCUMENTS

| | | | |
|---|---|---|---|
| 162,683 | 4/1875 | Nichols | 138/99 |
| 1,135,059 | 4/1915 | Scott | 138/99 X |
| 1,284,325 | 11/1918 | Hart | 138/99 X |
| 1,343,463 | 6/1920 | Meredith | 138/99 |
| 1,962,035 | 6/1934 | Reiter | 411/338 X |
| 2,111,267 | 3/1938 | Hoppenstand | 411/338 |
| 2,417,741 | 3/1947 | Dillon | 285/194 |
| 3,160,425 | 12/1964 | Sinnott | 138/99 X |
| 4,033,243 | 7/1977 | Kirrish et al. | 411/338 |
| 4,310,273 | 1/1982 | Kirrish | 411/338 |
| 4,365,393 | 12/1982 | Hauffe et al. | 138/99 X |
| 4,391,330 | 7/1983 | Saylor et al. | 138/99 |
| 4,490,083 | 12/1984 | Rebish | 411/338 |
| 5,899,506 | 5/1999 | Tseeng | 285/420 X |

*Primary Examiner*—Patrick Brinson
*Attorney, Agent, or Firm*—Koda & Androlia

[57] ABSTRACT

A fitting for holding and connecting steel pipes comprising: a holder and a coupler which are axially supported with each other at one end with a pin, a bolt which is inserted into a through hole provided at the other end of the coupler, and a cap nut which is provided inside the other end of the holder and into which the bolt is tightened, thereby holding a steel pipe. It is desirable for the cap nut to be fixed to the holder or for the through hole to be an unloaded hole. By so arranging, the steel pipe does not slide off from the tightening fitting, and in case of damage to the bolt, only the damaged bolt may be simply replaced with a new one, thereby making it possible to use the device for a long period of time. Moreover, since the screw portion of the bolt does not protrude, the clothes or body of the worker or passing person are not caught by a projecting end of the device so as to cause the clothes to be ripped or the body to be hurt.

5 Claims, 6 Drawing Sheets

6,041,823

FITTING FOR TIGHTENING STEEL PIPE

BACKGROUND OF THE INVENTION

1. Field of the Invention

The present invention relates to a fitting for tightening steel pipe and more particularly to a fitting for holding and connecting steel pipes to be used for assembling a steel pipe foothold, barricade, and the like.

2. Description of the Prior Art

Conventionally, as a fitting for tightening or holding the steel pipes for assemblying a steel pipe foothold, barricade, etc. used in, for instance, a construction work site and road repairing work site, there has been one having such a construction that, as shown for example in FIGS. 5 and 6, an end of the coupler 2 having an approximately arc-shaped lateral side is an axially supported by a pin 3 at an end of the holder 1 having an approximately L-shaped lateral side, and a bolt 10 axially supported on the other end of the holder 1 is inserted in the notch 11 formed on the other end of the coupler 2, and the nut 12 is fastened into the screw 10a of the bolt 10 to clamp the steel pipe 7.

However, the conventional fitting for tightening steel pipes is disadvantageous in that, when the tightening of the nut 12 loosens, the bolt 10 can slide off from the notch 11 and the steel pipe 7 may come off from the tightening fitting.

Furthermore, in the conventional fitting for tightening steel pipe, the bolt 10 and the nut 12 are usually tightened very firmly so as to prevent the steel pipe 7 from sliding off from the notch 11, and as a result, the bolt 10 tends to be damaged. In addition, since the bolt 10 is axially supported on the holder 1 and can not be simply fitted or detached, it is not possible to replace only the bolt 10 for a new one even if only the bolt 10 is damaged. Accordingly, once the bolt 10 has been damaged, the steel pipe tightening fitting itself becomes unusable.

Furthermore, when the nut 12 of the conventional fitting is fastened, the screw part 10a of the bolt 10 becomes exposed so as to project, by which it is liable to hook the clothes or bodies of a worker or passing person in the construction work site or road repair work site, and may rip the clothes or hurt the body.

SUMMARY OF THE INVENTION

It is, therefore, an object of the present invention to solve the above problems and provide a fitting for tightening or holding steel pipe wherein a steel pipe does not slide off from the tightened fitting, and if the bolt becomes damaged, only the damaged bolt is simply replaced with a new one, thereby making it possible to use the device for a long period of time.

It is another object of the present invention to provide a fitting for tightening or holding steel pipe which does not cause the clothes or body of a worker or passing person to be caught by its projecting end and rip the clothes or hurt the body since the screw portion of the bolt does not protrude from the device.

In view of the above, the fitting of the present invention is made so that an end of a coupler is axially supported on an end of a holder with a pin, and a bolt is inserted into a through hole provided at the other end of the coupler, and the bolt is tightened into a cap nut provided inside the other end of the holder, thereby holding a steel pipe between the holder and coupler.

It is desirable for the cap nut to be fixed to the holder or for the through hole to be an unloaded (or non-threaded) hole.

DETAILED DESCRIPTION OF THE PREFERRED EMBODIMENTS

Hereinafter, preferred embodiments of a fitting for tightening or holding a steel pipe of the present invention will be described in detail with reference to the accompanying drawings.

Figure 1:
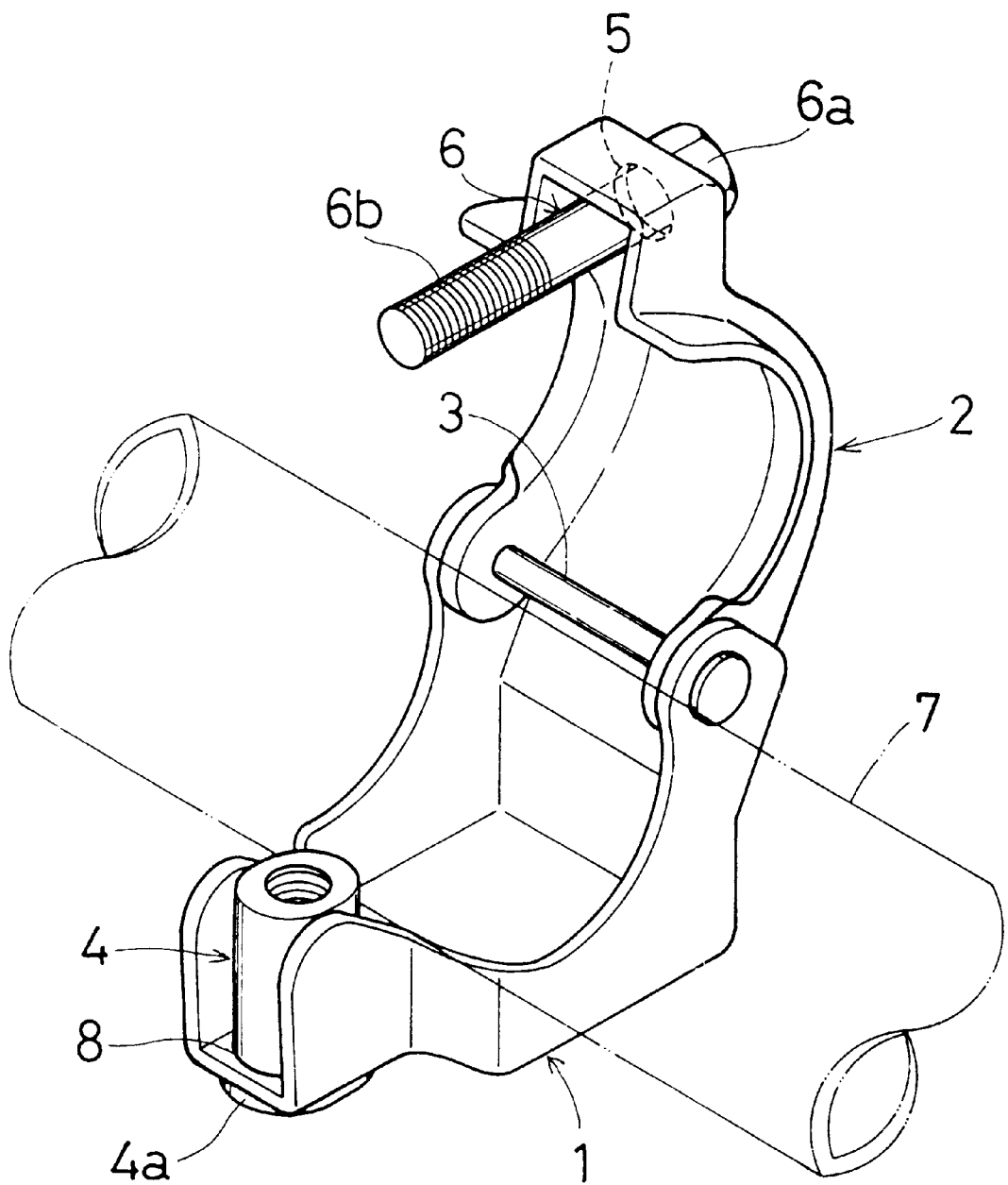
FIG. 1 is a perspective view of the fitting for tightening steel pipe according to the present invention.
Figure 2:
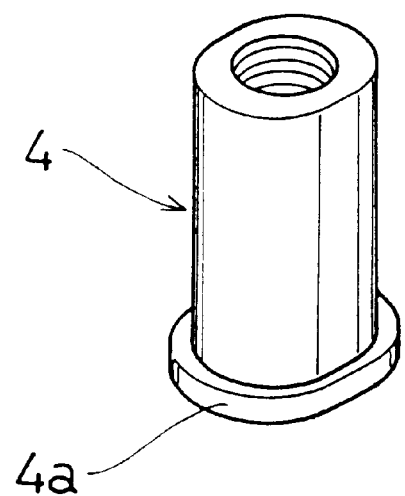
FIG. 2 is a perspective view of a cap nut to be used for the fitting for tightening steel pipe according to the present invention.

In accordance with one embodiment of the present invention as shown in FIGS. 1 and 2, a fitting for tightening or holding steel pipe comprises a holder 1 which has approximately an L-shaped lateral side and axially supports an end of a coupler 2 having an approximately arc-shaped lateral side with a pin 3 at one end. The holder 1 and coupler 2 have substantially arc-shaped inner surfaces which face each other so that a pipe 7 is clamped in between. Inside the other end of the holder 1 a cap nut 4 is provided, and at the other end of the coupler 2 there is provided a through hole 5. A bolt 6 having a bolt head 6a and a screw part 6b is inserted into the through hole 5, and the screw part 6b of the bolt 6 is screwed into the cap nut 4; as a result, the steel pipe 7 is clamped by the holder 1 and the coupler 2. A washer (not shown) may be fitted to the under surface of the bolt head 6a of the bolt 6 when the bolt 6 is inserted into the through hole 5 and tightened into the cap nut 4.

With the above constitution, the fitting of the present invention has such features that since the cap nut 4 that has a closed bottom is used, the screw part 6b of the bolt 6 does not protrude outside the fitting even when the bolt 6 is fastened in the cap nut 4, and the cap nut 4 which is fitted to the inside of the other end of the holder 1 does not protrude outside the fitting. Moreover, with a use of a bolt 6 that has a bolt head 6a rounded at the corner and relatively thin, the bolt head 6a protrudes outside the fitting by only a small degree, so that it does not hook to the clothes or body of a worker or passing person and rip the clothes or hurt the body. Furthermore, as long as the bolt 6 is screw-engaged with the cap nut 4, the bolt 6 does not come off from the through hole 5, and therefore, the steel pipe 15 does not slip off from the fitting.

It is desirable for the cap nut 4 to be fixed to the holder 1 so that there is no danger of it becoming lost by dropping off of the holder 1. Also, the cap nut 4 may be simply welded and fixed to the other end of the holder 1. If a cap nut 4 having a flange 4a formed at the lower end thereof is used, such a cap nut 4 can be welded at the flange 4a after being led into a through hole 8 provided on the other end of the holder 1, so that the cap nut 4 is securely fixed to the holder 1. Furthermore, the through hole 8 provided on the other end of the holder 1 may be formed as an unloaded (or non-threaded) hole. In this case, the cap nut 4 having a flange 4a which is formed at the lower end of the cap nut 4 and has a larger diameter than the through hole 8 is passed through the through hole 8 so that the periphery of the through hole 8 catches the cap nut 4 by its flange 4a, in which case the cap nut 4 does not need to be fixed to the holder 1.

As described above, the cap nut 4 is fixed to the other end of the holder 1, and the through hole 5 is formed as an unloaded hole so as to make a clearance between the bolt 6 and the through hole 5 when the screw part 6b of the bolt 6 is screwed into the cap nut 4. However, when the cap nut 4 having the flange 4a is fitted to the other end of the holder 1 by being passed through the through hole 8, a clearance can be formed between the cap nut 4 and the through hole 8 when the bolt 6 is screwed into the cap nut 4; accordingly, the through hole 5 does not need to be formed as an unloaded hole.

The steel pipe tightening or holding fitting of the present invention is used as follows.

Figure 3:
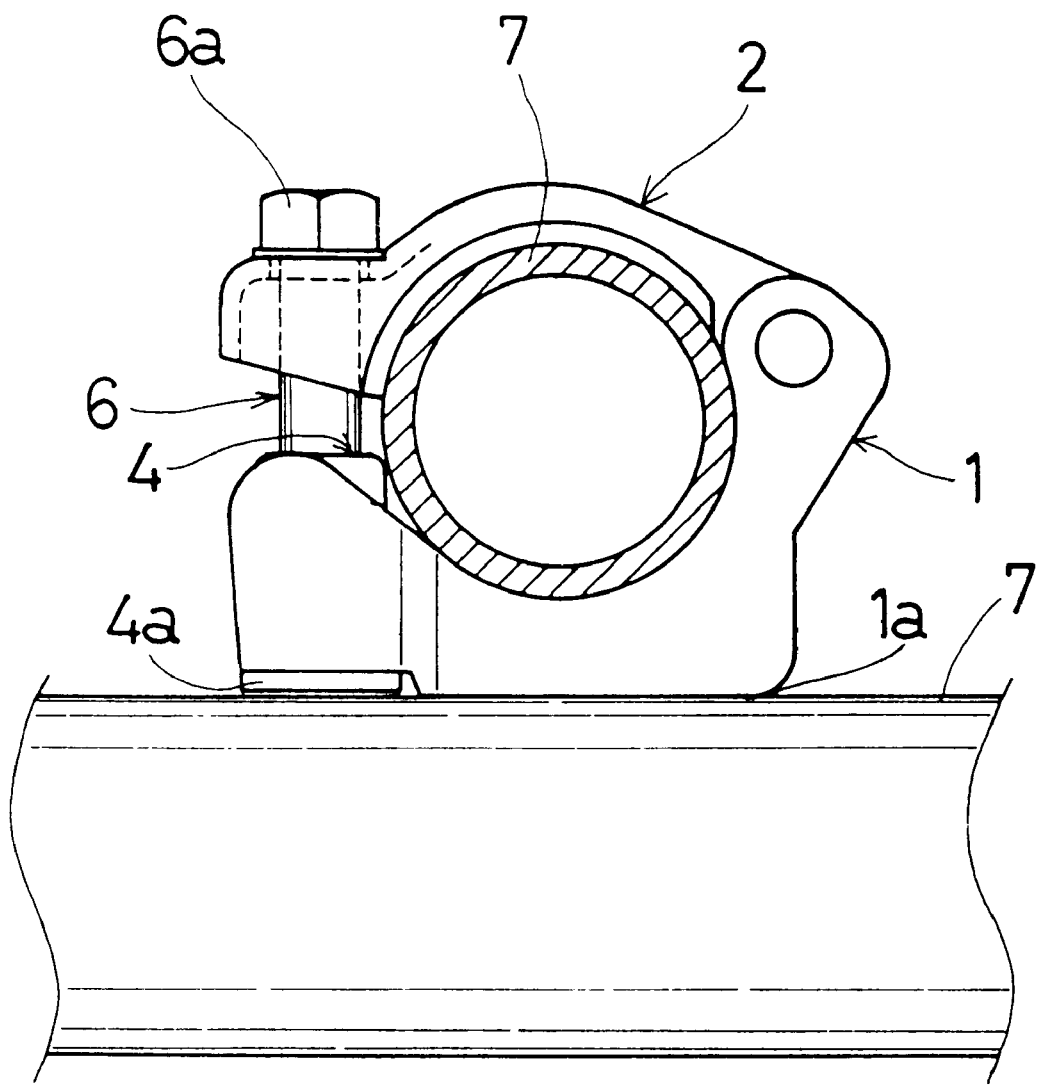
FIG. 3 is an illustrative view showing the condition of use of the fitting for tightening steel pipe according to the present invention.

At first, in order to assemble a steel pipe foothold in a construction work site or the like, as shown for example in FIG. 3, the fitting per se is fixed to one of the crossing steel pipes 7 by welding or with rivet to fix the bottom part 1a of the holder 1 of the fitting, and the bolt 6 is tightened into the cap nut 4 so that the other crossing steel pipe 7 is clamped by the holder 1 and the coupler 2; as a result, the crossing steel pipes 7 and 7 are fastened together. Alternatively, it may be so arranged that, using two fittings as a set, the bottom part 1a of the respective holders 1 are mutually coupled so as to be welded or fixed with rivets, so that the crossing steel pipes 7 are clamped by the respective holders 1 and the couplers 2, thereby tightening the crossing steel pipes 7 together.

Figure 4:
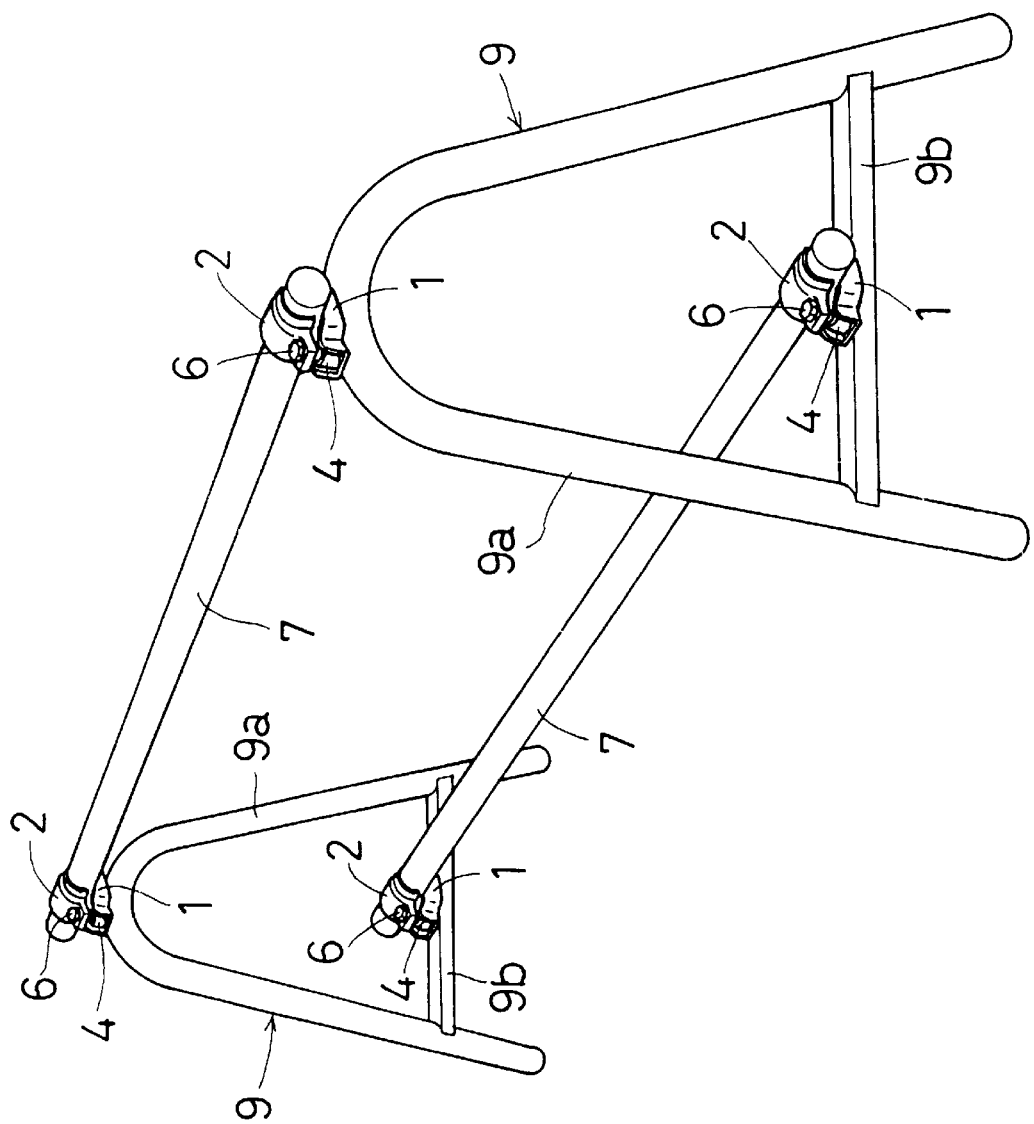
FIG. 4 is an illustrative view showing the condition of use of the fitting for tightening steel pipe according to the present invention.
Figure 5:
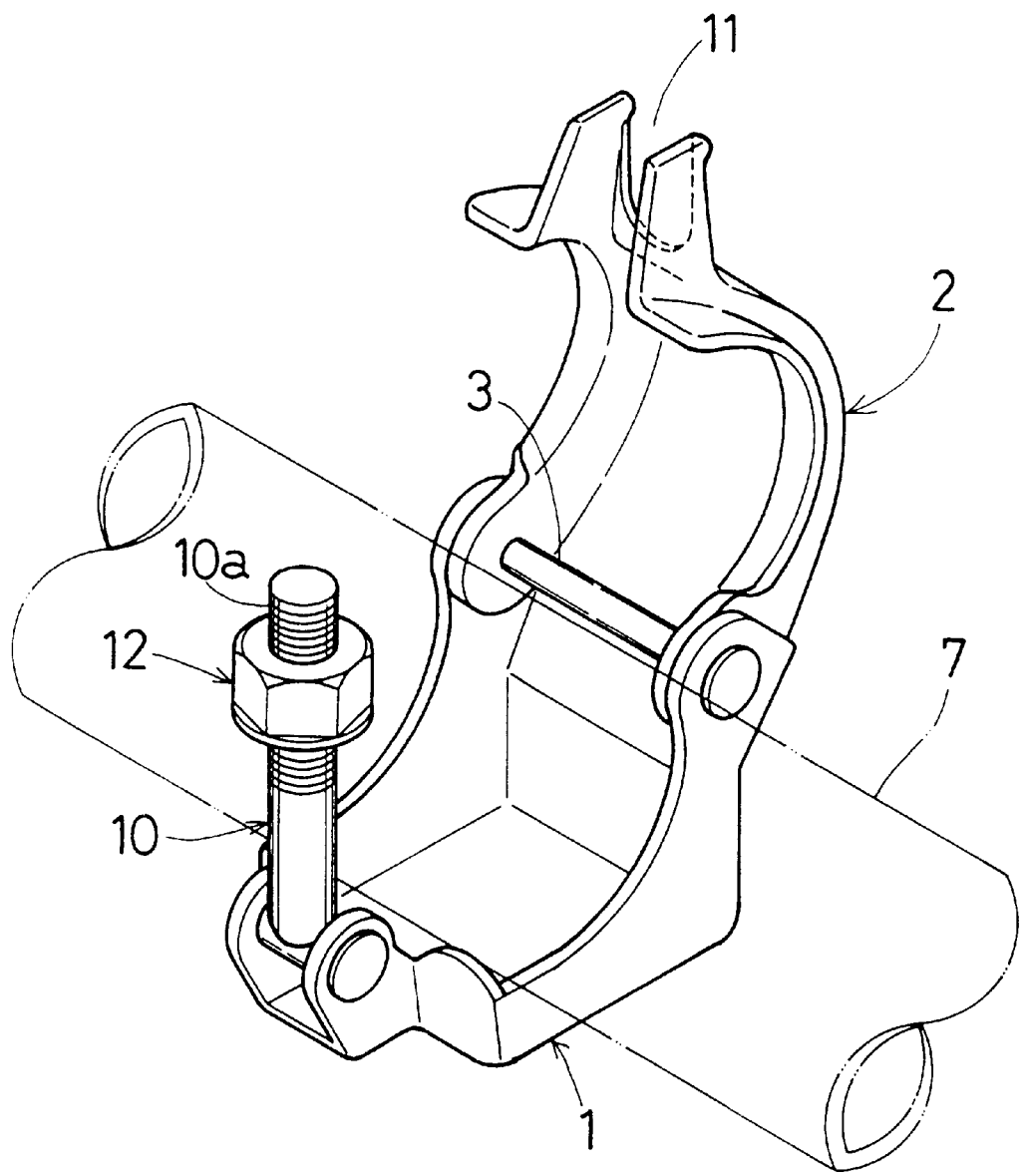
FIG. 5 is a perspective view of a conventional fitting for tightening steel pipe.
Figure 6:
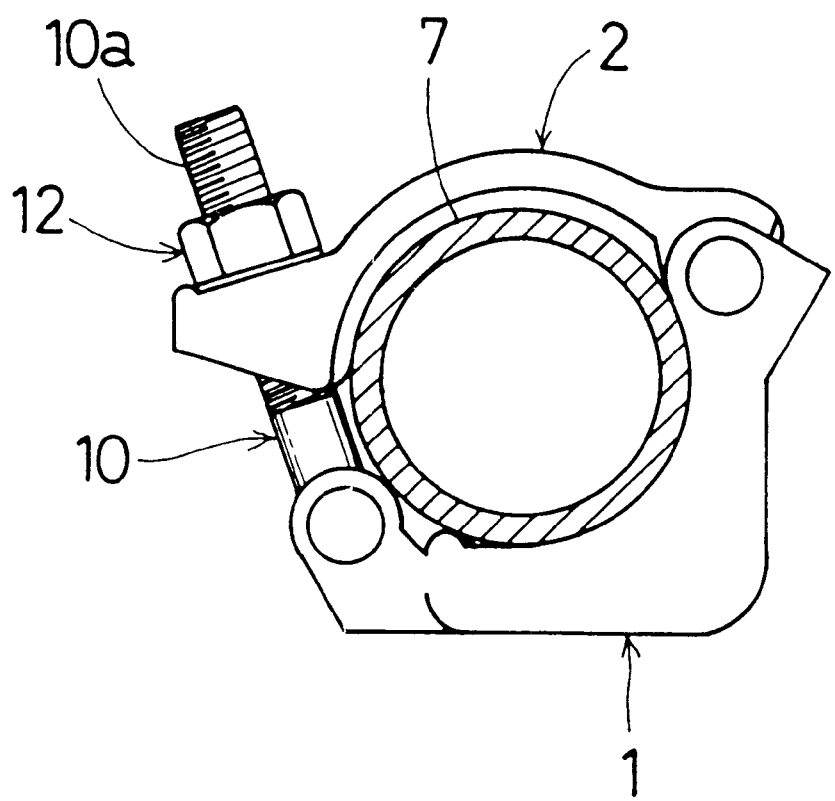
FIG. 6 is a side view of a conventional fitting for tightening steel pipe.

Furthermore, in order to assemble a barricade in a road repair work site or the like, as shown for example in FIG. 4, the bottom part 1a of the holder 1 of the fitting of the present invention is welded or fixed with rivets onto the upper end of a vertical frame body 9a and/or onto the central part of a side frame 9b of the respective barricades 9 which are placed at appropriate spaces, and the bolt 6 is tightened to the cap nut 4, so that the steel pipe 7 laid over these barricades 9 can be clamped. The barricade 9 and the steel pipe 7 are thus assembled together by way of the fitting.

According to the steel pipe tightening fitting of the present invention which is constituted as described above, the steel pipe does not slide off from the tightening fitting. In case of damage to the bolt, only the damaged bolt is simply replaced with a new one, and it becomes possible to use the device for a long period of time. Moreover, since the screw portion of the bolt does not protrude, the clothes or body of a worker or passing person are not caught by the device so as to cause the clothes to rip or the body to be hurt.

What is claimed is:

1. A fitting for tightening a steel pipe comprising;
    a holder (1) and a coupler (2) which are axially supported with each other at one end with a pin (3),
    a bolt (6) which is inserted from a through hole (5) provided at the other end of said coupler (2); and
    a cap nut (4) which is provided inside the other end of said holder (1) and including a central threaded hole, and into which said bolt (6) is tightened, thereby holding a steel pipe (7).

2. A fitting for tightening a steel pipe according to claim 1, wherein the cap nut (4) is fixed to the holder (1).

3. A fitting for tightening a steel pipe according to claim 1, wherein the through hole (5) is an unloaded hole.

4. A fitting for holding a steel pipe comprising:
    a holder having an arc-shaped surface on one side thereof;
    a cap nut provided inside of one end of said holder, said cap nut including a central threaded hole;
    a coupler pivotally coupled at one end thereof to another end of said holder by a pin, said coupler being provided with a through hole at another end thereof, said coupler having an arc-shaped surface on one side thereof so as to hold said steel pipe between said arc-shaped surface of said holder and said arc-shaped surface of said coupler; and
    a bolt provided in said through hole in said coupler, said bolt extended toward and screw engageable with said threaded hole in said cap nut.

5. A fitting according to claim 4, wherein said cap nut is provided with a flange at one end thereof and is inserted into a through hole formed in said one end of said holder so as to be removable from said holder.

* * * * *